United States Patent
Schatz

(10) Patent No.: US 8,863,702 B2
(45) Date of Patent: Oct. 21, 2014

(54) INTERNAL COMBUSTION ENGINE OF AN AUTOMOTIVE VEHICLE WITH A HEAT STORAGE DEVICE THAT PROVIDES REUSABLE HEAT

(71) Applicant: Investorengemeinschaft Kroecker GbR, Bad Kohlgrub (DE)

(72) Inventor: Oskar Schatz, Kroeppen (DE)

(73) Assignee: Innovationsschatz GmbH, Gilching (DE)

( * ) Notice: Subject to any disclaimer, the term of this patent is extended or adjusted under 35 U.S.C. 154(b) by 0 days.

(21) Appl. No.: 13/656,356

(22) Filed: Oct. 19, 2012

(65) Prior Publication Data

US 2013/0098317 A1    Apr. 25, 2013

(51) Int. Cl.
- *F01P 3/00* (2006.01)
- *F01P 11/02* (2006.01)
- *F28D 20/00* (2006.01)
- *B23P 19/04* (2006.01)
- *F01P 11/20* (2006.01)

(52) U.S. Cl.
CPC ............... *F01P 3/00* (2013.01); *F01P 11/0285* (2013.01); *F01P 2011/205* (2013.01); *F28D 20/00* (2013.01); *B23P 19/04* (2013.01); *F01P 2060/08* (2013.01)
USPC .......................................... 123/41.44; 165/10

(58) Field of Classification Search
CPC .... F02G 1/043; F01P 2011/205; F01P 11/02; F01P 11/0285; F01P 2060/08; F01P 3/00
USPC ................... 123/41.14, 41.01, 142.5 R, 41.2; 165/10, 202, 63, 64, 42, 45
See application file for complete search history.

(56) References Cited

U.S. PATENT DOCUMENTS 4,415,118 A * 11/1983 Endo ........................ 237/12.3 A
5,662,072 A *  9/1997 Suzuki et al. ............... 123/41.14
(Continued)

FOREIGN PATENT DOCUMENTS

DE  19512821 A1   4/1995
DE  19535027 A1   9/1995
(Continued)

OTHER PUBLICATIONS

Office Action mailed Jul. 17, 2012, by the German Patent Office in the foreign counterpart application DE 10 2011 116 387.9 (7 pages).

*Primary Examiner* — Noah Kamen
*Assistant Examiner* — Long T Tran
(74) *Attorney, Agent, or Firm* — Imperium Patent Works

(57) ABSTRACT

A heat storage device keeps engine coolant hot during operating pauses of the engine allowing quick heating during a cold start of the engine. The capacity of the heat storage device for coolant is twice as large as the capacity for coolant of the coolant circulation system and the engine. An inflow line, an outflow line and a ventilation line pass through the bottom of the heat storage device and are heat insulated on the inside of the heat storage device. Hot coolant from the heat storage device is transferred in two portions into the cold engine. The second portion is transferred when the rising temperature of the metal motor mass has come close to the falling temperature of the first portion of coolant that was circulating in the engine. The heat storage device includes outer and inner containers with a high vacuum in the insulating space between the containers.

16 Claims, 5 Drawing Sheets

(56) References Cited

U.S. PATENT DOCUMENTS

| | | | | |
|---|---|---|---|---|
| 5,765,511 | A | 6/1998 | Schatz | 123/41.14 |
| 6,178,929 | B1 | 1/2001 | Schatz | 123/41.14 |
| 6,629,512 | B2 | 10/2003 | Iwatani et al. | 123/41.14 |
| 6,742,480 | B2 * | 6/2004 | Onimaru et al. | 123/41.01 |
| 7,156,155 | B2 * | 1/2007 | Kudo | 165/10 |
| 2003/0006239 | A1 * | 1/2003 | Onimaru et al. | 220/592.01 |
| 2003/0011150 | A1 * | 1/2003 | Goldsmith et al. | 280/11.18 |
| 2009/0288617 | A1 * | 11/2009 | Hiyama | 123/41.14 |
| 2010/0116485 | A1 * | 5/2010 | Hiyama | 165/202 |
| 2011/0000206 | A1 * | 1/2011 | Aprad | 60/517 |

FOREIGN PATENT DOCUMENTS

| | | |
|---|---|---|
| DE | 19818030 C2 | 4/1998 |
| DE | 60131704 T2 | 7/2000 |
| DE | 10344018 A1 | 9/2003 |
| DE | 102010010276 A1 | 3/2010 |
| DE | 102010013047 A1 | 3/2010 |
| DE | 202011003696 U1 | 3/2011 |

* cited by examiner

INTERNAL COMBUSTION ENGINE OF AN AUTOMOTIVE VEHICLE WITH A HEAT STORAGE DEVICE THAT PROVIDES REUSABLE HEAT

CROSS REFERENCE TO RELATED APPLICATIONS

This application is a continuation in part of, and claims the benefit under 35 U.S.C. §119 from, German Application No. DE 10 2011 116 387.9 filed in Germany on Oct. 20, 2011, and German Application No. DE 10 2012 003 826.7 filed in Germany on Feb. 29, 2012. The subject matter of each of the foregoing documents is incorporated herein by reference.

TECHNICAL FIELD

The present invention relates to a combustion engine, particularly for motor vehicles, with a heat storage device for keeping the engine coolant warm during operating pauses of the engine, and to a method for the operation thereof, particularly for rapid heating of a motor vehicle engine during a cold start for the purpose of reducing noxious exhaust gas emissions of the engine, and for improving the heating comfort in the vehicle, as well as to a heat storage device that is particularly well suited for these purposes.

BACKGROUND INFORMATION

In commercial motor vehicle engines with a heat storage device, the capacity of the heat storage device is usually equal to the coolant volume of the engine, for example, two liters. Here, the coolant volume of the engine denotes the volume that is taken up by the coolant in a design without coolant accumulator. At the time of starting of the engine, the hot coolant flows due to the action of a coolant pump from the heat storage device into the cold engine. At the same time, the cold coolant flows out of the engine into the heat storage device, where it remains for the time being. In this context, the term coolant exchange is used. The supplied hot coolant then circulates exclusively under the action of the coolant pump between the engine and the heat exchanger. As a result of this coolant exchange, the stored heat quantity is dissipated into the cold engine and via the heat exchanger into the interior of the vehicle, and as a result, the time that it takes to reach the operating temperature is shortened, and comfort of the vehicle occupants is achieved earlier.

After the engine has warmed up, the cold coolant from the accumulator is gradually mixed, by appropriate switching of a control valve, with the hot coolant in the engine. Optionally, superheated coolant is led through the cooler and cooled there. If the engine is switched off after a sufficiently long operating period, the coolant in the engine, heat exchanger and heat storage device is brought to the same temperature. During the subsequent operating pause, the coolant in the heat storage device maintains its temperature approximately, while the coolant in the engine and in the heat exchanger together with these components cools rapidly.

In spite of the above-described improvements, there is still the desire for and thus the problem of further reducing the emissions associated with the cold start and improving the heating comfort. A heat storage device is sought that more quickly and efficiently heats a cold engine upon starting.

SUMMARY

A heat storage device increases the heat quantity that is available upon the cold start of an engine in order to increase the temperature of the cooled components and of the cold coolant in the engine to the desired operating temperature. The capacity of the heat storage device for coolant is greater than the capacity for coolant of the engine and the coolant circulation system of the vehicle. In one embodiment, the capacity of the heat storage device for coolant is approximately twice as large as that of the engine and the circulation system.

During a cold start of an engine, a first partial volume of the hot coolant stored in the heat storage device is transferred to the engine. The volume of this first portion corresponds to the capacity for coolant of the engine. As the first portion is transferred into the engine, a corresponding volume of the cold coolant located in the engine is transferred into the heat storage device.

Transferring hot coolant into an engine that contains cold coolant mixes the hot and cold coolant. Moreover, returning the cold coolant from the engine to a heat storage device that contains the second portion of hot coolant can also mix the hot and cold coolant. This mixing is undesirable and can be reduced by taking into consideration the temperature-caused density differences of the coolant. The opening of the outflow line leading from the heat storage device to the engine is placed at the inside top of the heat storage device so that the warm coolant flows off from there. Moreover, the opening of the inlet to the heat storage device for cold coolant from the engine is placed in the vicinity of the inside bottom of the heat storage device.

For heat insulation in the rest state, it is advantageous that the inflow line and the outflow line for the coolant enter through the bottom of the heat storage device and that the inflow and outflow lines are heat insulated in the vicinity of the bottom of the heat storage device. The inflow line is preferably designed as an ascending inlet that is bent back down after emerging vertically up from a heat insulation enclosing it such that its opening is in the vicinity of the bottom of the heat storage device. However, this design does not completely eliminate the mixing of hot and cold coolant and the heat conduction between the two volumes of coolant.

Another embodiment of the heat storage device prevents the undesired mixing and heat flow even more. Mixing is prevented even more by subdividing the heat storage device into two chambers that are separately heat insulated. The flow of coolant through the two chambers is controlled by a pipe system, valves and pumps in accordance with the heating and cooling needs of the engine. The heat storage device is subdivided into two mutually heat insulated chambers. In order to adapt to the available installation space in the engine compartment, the two chambers can have different sizes.

In a combustion engine, particularly for motor vehicles, with a heat storage device for keeping engine coolant hot during operating pauses of the engine, the capacity of the heat storage device for coolant is greater than the capacity for coolant of the engine and the coolant circulation system. An inflow line, an outflow line and optionally a ventilation line enter into the bottom of the heat storage device. The hot coolant from the heat storage device is transferred into the engine for the purpose of heating the cold engine in two temporally offset portions. The second portion of hot coolant is transferred from the heat storage unit to the engine when the rising temperature of the metal motor mass has come close to the falling temperature of the first portion of coolant that has already circulated through the engine.

The coolant flow is controlled by control valves so that the coolant either bypasses the heat storage device after the engine is warmed up or passes through the heat storage device via one of, the other of, or both of the chambers. In one embodiment, the heat storage device contains deflecting plates that guide the coolant flow in a meandering pattern in the vertical direction.

In another embodiment, the heat storage device has a ventilation line with an opening in the vicinity of the top of the inside of the heat storage device. The ventilation line allows the heat storage device to be only partially filled. For this purpose, the opening of the outlet line for the coolant is placed at mid height in the inside of the heat storage device. The inlet of the inflow line leads back down towards the bottom of the heat storage device after emerging vertically up out of a heat insulation covering. The location of the inlet allows cold coolant to enter the heat storage device at the bottom. By placing the opening of the outlet line at mid height in the heat storage device, the volume of coolant used by the heat storage device can be reduced without affecting the improvement of the cold start properties achieved through the invention. The volume of coolant can be reduced by one third, which also results in an associated weight reduction in the coolant that must be continually transported by the vehicle.

A method of operating a combustion engine includes pumping hot coolant from the heat storage device into a cold engine filled with cold coolant during the cold start of the engine. As the hot coolant is pumped into the engine, cold coolant is pushed from the engine back into the bottom area of the heat storage device. After the cold start, the coolant circulation can bypass the heat storage device.

After the rising temperature of the engine mass has come close to the falling temperature of the first portion of hot coolant that has been circulating in the engine, the second portion of the hot coolant is transferred from the heat storage device into the engine and the coolant circulation system. After the second portion of hot coolant is transferred to the engine, a continuous exchange of hot coolant between the engine and the heat storage device can occur.

In another embodiment, a heat storage device includes an inner container that is ensheathed by an outer container. An insulating space containing a high vacuum is formed between the inner and outer containers. The inner container is formed from two interconnected chambers in order to adapt to the constricted space of the engine compartment. Each chamber is designed as a segment of a circular cylinder that has been compressed along a chord of the circular cross section. The chambers are separated from each other by partition walls situated along the chords of the circular cross sections. The chambers are attached to each other by the partition walls. A bar of a T-shaped supporting frame is placed in the plane defined by the partition walls. The top of the T-shaped supporting frame is attached to the inner surface of the outer container such that a separation is maintained between the bar and the inner container.

A system includes an engine, a coolant circulation system and an insulated heat storage device. The engine is an internal combustion engine of a motor vehicle. The coolant circulation system and the engine have a combined capacity for containing a coolant, such as a water-antifreeze mixture used to cool the engine. Coolant that has been heated by the engine is kept hot by the insulated heat storage device. For example, the insulation is achieved using a vacuum. After a pause in the operation of the engine, hot coolant flows from the heat storage device, through the coolant circulation system and back into the engine. The heat storage device has a capacity for coolant that is greater than the combined capacity for coolant of the coolant circulation system and the engine. In one embodiment, the capacity for coolant of the heat storage device is twice as large as the combined capacity for coolant of the coolant circulation system and the engine.

A method of using a heat storage device during the cold start of an engine includes transferring hot coolant from the insulated heat storage device to the cold engine and simultaneously transferring cold coolant from the engine back to the heat storage device. A first portion of hot coolant is transferred from the heat storage device through a coolant circulation system to the engine. While the hot coolant is being transferred to the engine, cold coolant is transferred from the engine through the coolant circulation system to the heat storage device. The cold coolant enters the heat storage device at the bottom of the inside of the heat storage device, and the hot coolant exits the heat storage device at the top of the inside of the heat storage device. The temperature of the engine block increases after the first portion of hot coolant is transferred from the heat storage device into the cold engine. After the increasing temperature of the engine approaches the falling temperature of the first portion of hot coolant in the engine, then a second portion of hot coolant is transferred from the heat storage device to the engine and further increases the temperature of the engine.

A method of making an insulated heat storage device for an automotive vehicle includes forming inner and outer containers and generating a high vacuum between the containers. An inner container is formed from two nearly cylindrical chambers having different diameters. Each chamber is a partially collapsed cylinder with a partition wall along a chord of the circular cross section of the collapsed cylinder. Parallel deflecting plates are attached inside the two nearly cylindrical chambers so as to form meandering paths through which coolant can flow vertically. The inner container is then inserted into the outer container. A supporting frame is attached to the inside surface of the outer container adjacent to where the two nearly cylindrical chambers are attached to one another. Inlet and outlet openings are formed in the bottom of each of the two nearly cylindrical chambers. The high vacuum is then generated between the inner container and the outer container. Coolant flows through the heat storage device in vertically oriented meandering paths formed by the deflecting plates.

Further details and embodiments are described in the detailed description below. This summary does not purport to define the invention. The invention is defined by the claims.

BRIEF DESCRIPTION OF THE DRAWINGS

The accompanying drawings illustrate embodiments of the invention.

FIG. 2 illustrates a "coolant exchange" operating mode wherein the engine and the heat storage device are filled with coolant during an operating pause of the engine.

FIG. 4 illustrates a "coolant transfer" operating mode wherein during an operating pause the engine is empty and the entire coolant volume is heat insulated in the heat storage device. The engine and the heat storage device are each ventilated via an independent ventilation line to the atmosphere.

DETAILED DESCRIPTION

In the following description of non-limiting embodiments, an engine with a coolant volume of two liters and a capacity of the heat storage device of four liters is used as a basis.

Figure 1:
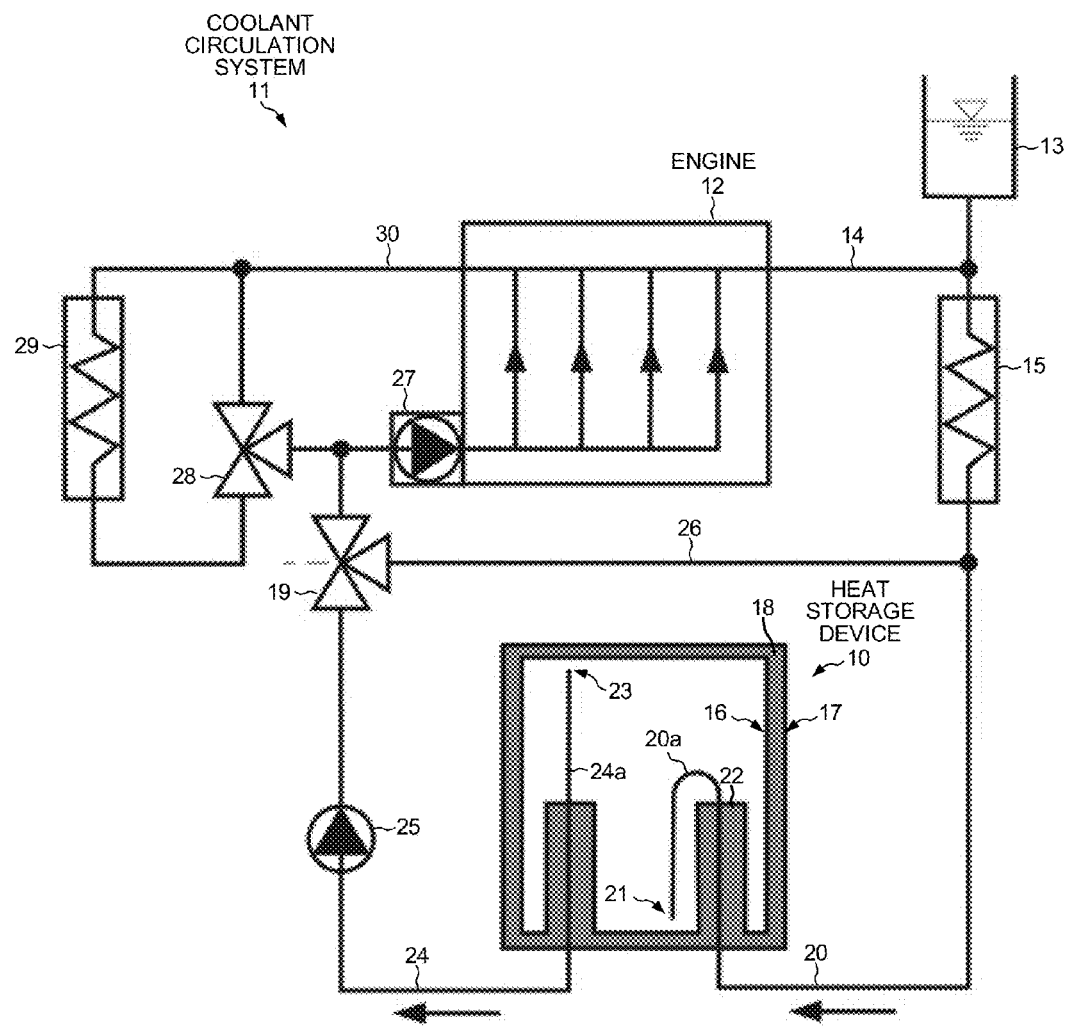
FIG. 1 shows the coolant circulation system of a piston combustion engine that includes a novel heat storage device for the coolant of the engine.

FIG. 1 is a schematic diagram of a heat storage device 10 connected to a coolant circulation system 11 of a piston combustion engine 12. Heat storage device 10 keeps at least a portion of the engine coolant hot during an operating pause of engine 12. Heat storage device 10 has a capacity for coolant of four liters, which is twice as large as the two-liter coolant capacity of engine 12. A compensation container 13 is connected to segment 14 of coolant circulation system 11 between engine 12 and a heat exchanger 15. Compensation container 13 allows the required coolant volume to be maintained in engine 12 and also allows engine 12 to be ventilated in the event of a transfer of coolant transfer, such as also occurs in FIG. 4.

Heat storage device 10 has an inner container 16 and an outer container 17 that enclose between themselves an insulated space 18 that contains a high vacuum. By using the appropriate setting of a three-way valve 19, the coolant fluid flows through heat storage device 10 during operation of engine 12. This embodiment of heat storage device 10 does not have deflecting plates for the coolant flow.

At the start of operation of engine 12, cold coolant flows out of engine 12 and into heat storage device 10, and hot coolant flows out of heat storage device 10 and into engine 12. Two liters of cold coolant flows out of engine 12 and into heat storage device 10 via the inflow line 20. The cold coolant flows through inlet 20a and out of opening 21 into the bottom of heat storage device 10. Inlet 20a is designed as an ascending inlet that is then bent back down after emerging vertically up from heat insulation 22 that encloses it such that its opening 21 is in the vicinity of the bottom of heat storage device 10.

While cold coolant flows into heat storage device 10 at the bottom, hot coolant flows out from the top of heat storage device 10 into an opening 23 of outlet 24a. Two liters of the hot coolant enters the outflow line 24, flows through an electrically operated pump 25, and enters engine 12. The three-way valve 19 is switched in such a manner that the warm coolant first flows from heat storage device 10 through engine 12, through heat exchanger 15, and then back through inflow line 20 to heat storage device 10.

Thereafter, coolant is circulated via the bypass line 26 through engine 12 and heat exchanger 15 until both are filled with hot coolant. An engine-side cooling water pump 27 circulates the coolant between engine 12 and heat exchanger 15. After engine 12 and heat exchanger 15 contain hot coolant, heat exchanger 15 is bypassed by an appropriate setting of valve 19 and another three-way value 28. The cooling of the hot engine 12 then occurs via a radiator 29 and the portion 30 of cooling circulation system 11 by appropriate switching of valves 19 and 28.

Figure 2:
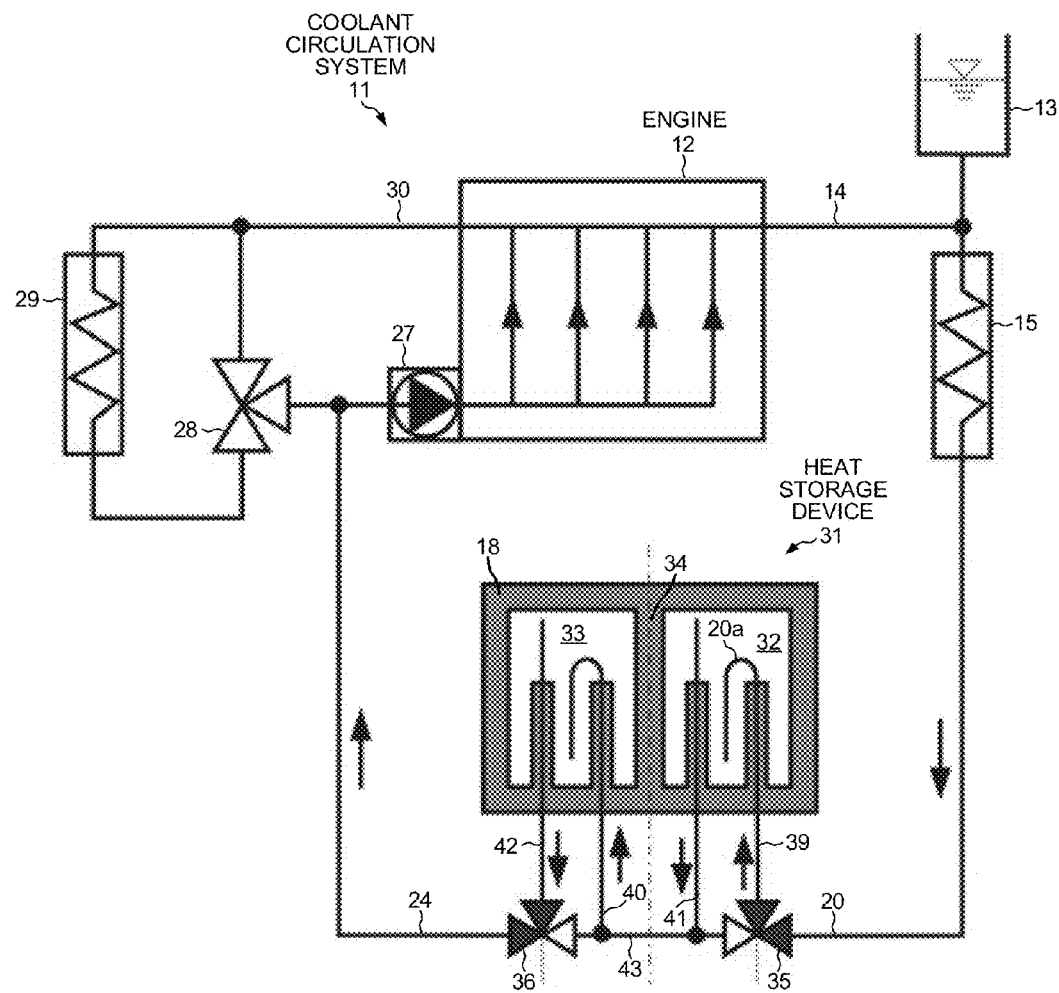
FIG. 2 shows a coolant circulation system similar to FIG. 1 with a heat storage device whose capacity is distributed over two mutually heat-insulated chambers that can be separately operated by two three-way valves.

FIG. 2 shows a schematic diagram of the coolant circulation system 11 of piston combustion engine 12 of FIG. 1 in which the capacity for coolant of heat storage device 31 is four liters and the capacity for coolant of engine 12 is two liters. The heat storage device 31 is subdivided into two equal, mutually heat-insulated chambers 32 and 33 that are separated by a partition wall 34. Coolant can flow simultaneously or separately to and from each of the chambers 32 and 33. Thus, while starting engine 12, it is possible to introduce the cold coolant from engine 12 into one of the two chambers 32 or 33, and to push a first portion of hot coolant out of that chamber 32 or 33 through the outflow line 24 into engine 12. Subsequently after the temperature of the hot coolant introduced into engine 12 has cooled to the temperature of the entire residual volume in engine 12, a second portion of hot coolant located in the other chamber 32 or 33 can be pushed out into the already prewarmed engine 12.

Figure 3:
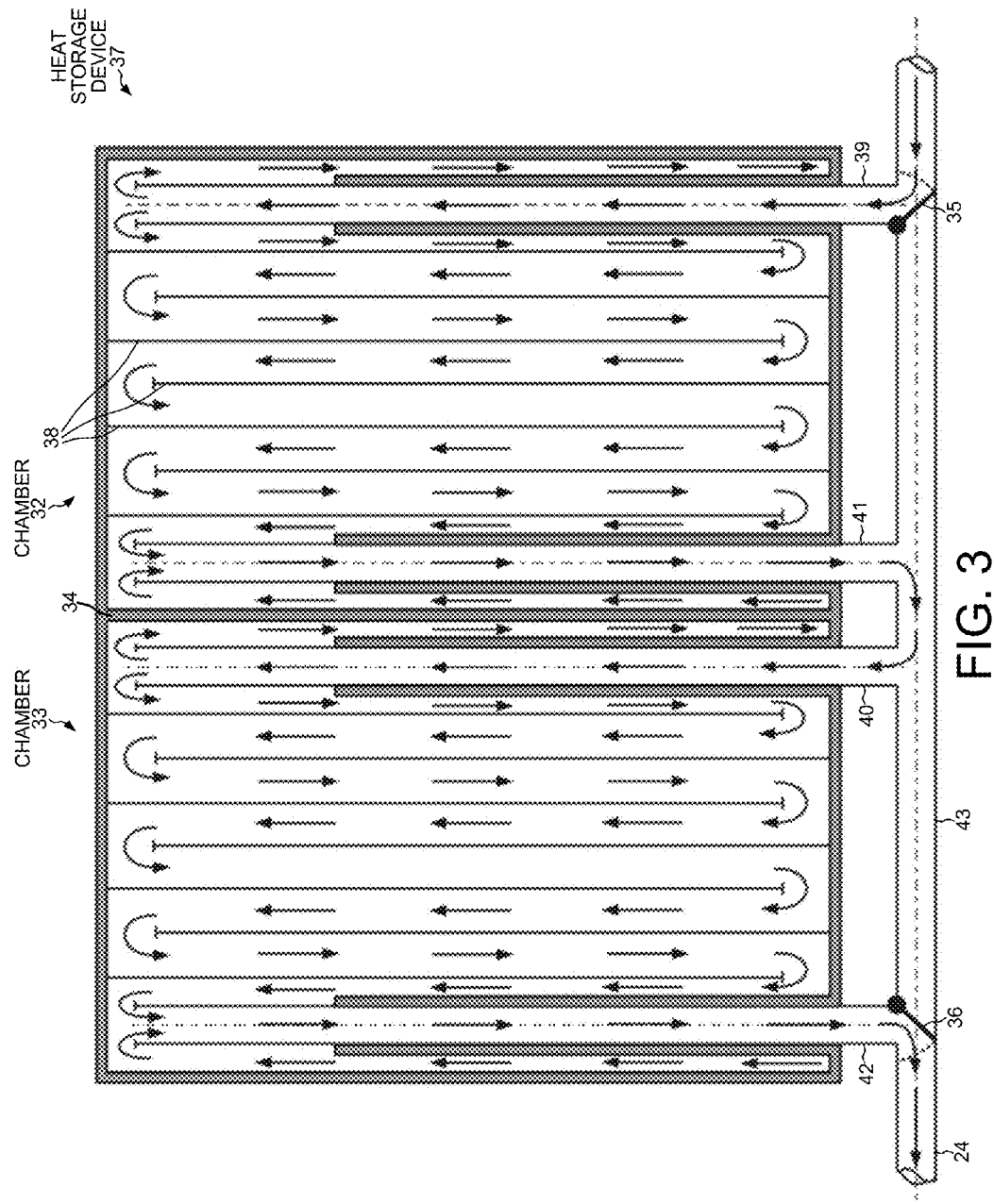
FIG. 3 shows a heat storage device for the coolant of an engine with two mutually heat-insulated chambers that can be separately operated by two three-way valves and in which the flow paths of the coolant in the chambers extend vertically, and the inlet and outlet pipes are each enclosed by heat insulation.

FIG. 3 shows a heat storage device 37 similar to the one in FIG. 2 except with deflecting plates 38 for coolant flow. The mixing of cold and hot coolant during the loading and unloading of heat storage device 37 is impeded by the deflecting plates 38 that guide the flow of the coolant in vertical meandering paths. The switching of the control flaps 35 and 36, in a manner similar to that shown in FIG. 2, allows the flow of the coolant through chambers 32 and 33 to be controlled independently of each other. Thus, during a cold start of engine 12, the two liters of cold coolant can be pushed out of engine 12 into an inflow duct 39 or 40 of either of the chambers 32 or 33, and an equal amount of hot coolant can leave the chamber through an outflow duct 41 or 42. As a result, the hot coolant is moved from a first chamber 32 of heat storage device 37 into engine 12 and circulates there until temperature equilibrium between the engine 12 and the coolant has been reached. Then, the hot coolant of the second chamber 33 is pushed into engine 12, which additionally increases the engine temperature.

FIG. 3 shows the flow of coolant after engine 12 has started and has heated up. Then the hot coolant is circulated through both chambers 32 and 33 in the manner shown in FIG. 3 in order to fill both chambers with hot coolant before the engine is shut off. Control flaps 35 and 36 are set such that coolant flows through inflow duct 39 into first chamber 32, out outflow duct 41 filling circulation duct section 43, into second chamber 33 through inflow duct 40, and out outflow duct 42 into outflow line 24.

Figure 4:
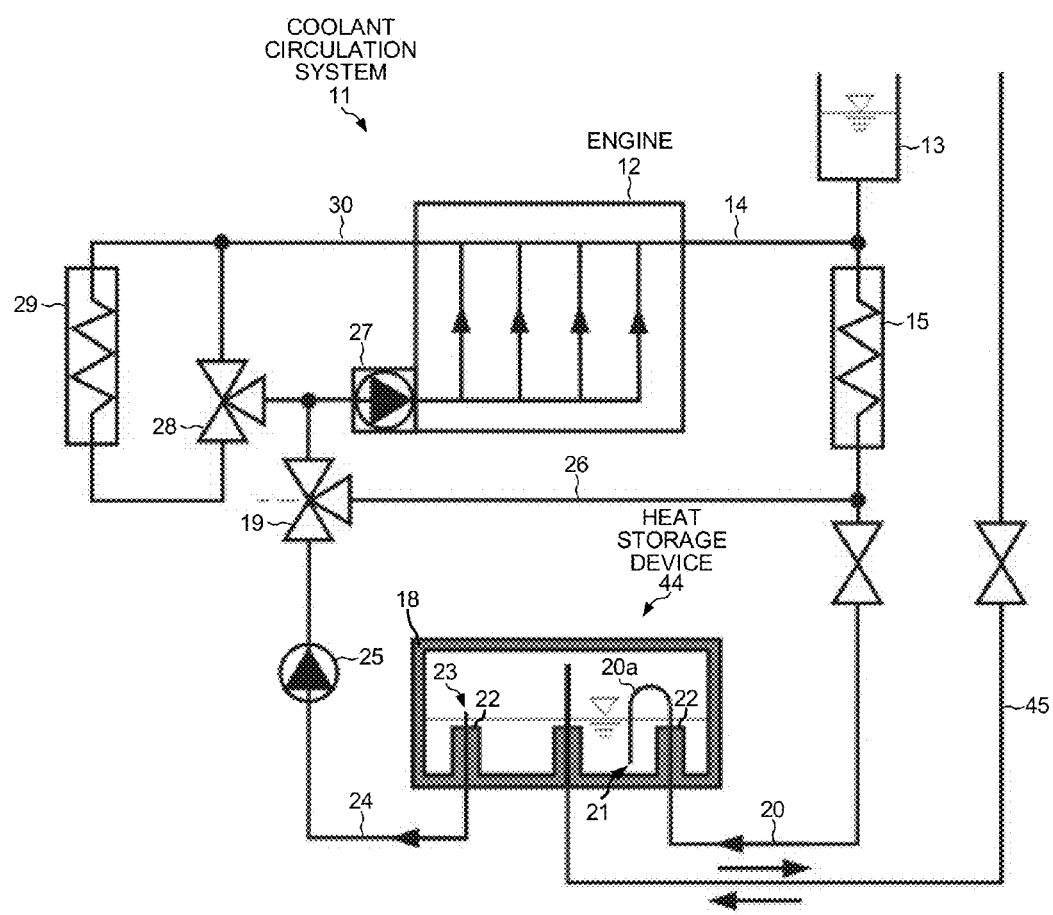
FIG. 4 shows a coolant circulation system of a piston combustion engine with a heat storage device whose capacity is twice as large as the capacity of the engine.

FIG. 4 shows another embodiment of a heat storage device 44 in coolant circulation system 11. Just as for heat storage unit 10, heat storage device 44 has a capacity of four liters. However, the coolant volume of the entire coolant circulation system 11 is reduced to four liters in this embodiment. In comparison to the other embodiments described above, a total coolant volume of four liters is a reduction by two liters, or by one third. Heat storage device 44 allows for the transfer of hot coolant from heat storage device 44 into the coolant-free engine 12 when the engine is being started, as well as for the transfer of hot coolant from engine 12 into heat storage device 44 at the end of operation of engine 12. In contrast to a coolant exchange in which cold coolant is replaced with hot coolant from a heat storage device, in this embodiment hot coolant is moved into empty containers. For example, at the time engine 12 is started coolant from heat storage device 44 is pumped into the empty circulation system 11 of engine 12. At the end of the operation of engine 12, coolant from engine 12 is allowed to drain into the half empty heat storage device 44. The respective coolant-free space in either engine 12 or heat storage device 44 is filled with air.

During a pause in the operation of engine 12, the entire coolant volume of four liters is located in heat storage device 44. Of that volume, at the beginning of warming up the cold engine, a first portion of two liters of the four liters of hot coolant is moved into engine 12, where the two liters are used for cooling after they warm up the engine. Opening 23 of outflow line 24 of heat storage device 44 is located at mid height in heat storage device 44 so that, during operation of engine 12, the heat storage device 44 cannot take up more than two liters of coolant. But when engine 12 is stopped, the coolant flows out of engine 12 and heat exchanger 15 by gravity, through inflow line 20 and into heat storage device 44 so that the entire capacity of the heat storage device is used. Without the suction of pumps 25 and 27, heat storage device 44 fills above opening 23 of outflow line 24 because outflow line 24 is full of coolant.

Inflow line 20 for the coolant that is supplied from engine 12 opens at opening 21 of outlet 20a at the bottom of heat storage device 44 so that the hot coolant of the second portion remaining in the heat storage device 44 is raised by the entering cooler coolant of the first portion that was first pumped into engine 12. The rising hot coolant thus reaches the center of heat storage device 44 at opening 23 of outflow line 24, which is under the suctioning action of pump 27 and optionally pump 25 during the transfer of the coolant portions and at the time of coolant circulation through heat storage device 44.

At the time engine 12 is shut down, the entire coolant is moved into heat storage device 44. During operation of engine 12, half of the coolant is in engine circulation system 11 and engine 12 and the other half is in heat storage device 44. During engine operation, coolant pump 27 circulates the coolant via bypass line 26 between engine 12 and heat exchanger 15 by appropriate switching of the valve 19. Heat storage device 44 allows the weight of the coolant to be reduced by two kilograms, which is important for the cost effectiveness of the vehicle operation such as by improving gas mileage. Moreover, a design of engine circulation system 11 employing heat storage device 44 eliminates the mixing of hot coolant with cold coolant in engine 12 at the beginning of operation.

To produce this type of heat transfer device, an air ventilation line 45 is provided between the inside ceiling of heat transfer device 44 and the atmosphere, which allows for pressure compensation between heat storage device 44 and the atmosphere. Similarly, engine circulation system 11 is ventilated through compensation container 13 so that the circulation system is ventilated when engine operation pauses and the coolant flows out of engine 12.

The embodiments above that employ coolant transfer in engines having a coolant capacity of two liters can be used with two-liter heat storage devices and with four-liter heat storage devices. In both cases, a weight reduction of two kilograms of coolant per engine is possible.

Instead of beginning to warm engine 12 with hot coolant when engine 12 is started, for which variants are described above that use various heat storage devices, it is also possible to introduce the hot coolant into engine 12 before the engine is even started. The first portion of hot coolant is transferred into engine 12 in response to a control pulse triggered by the opening of the lock of the driver-side door of the vehicle. The transfer of the second portion of hot coolant is made in response to a second control pulse that is triggered by the actuation of the engine starter. These control pulses are received by an engine management system, which then controls the valves and pumps of coolant circulation system 11.

Figure 5:
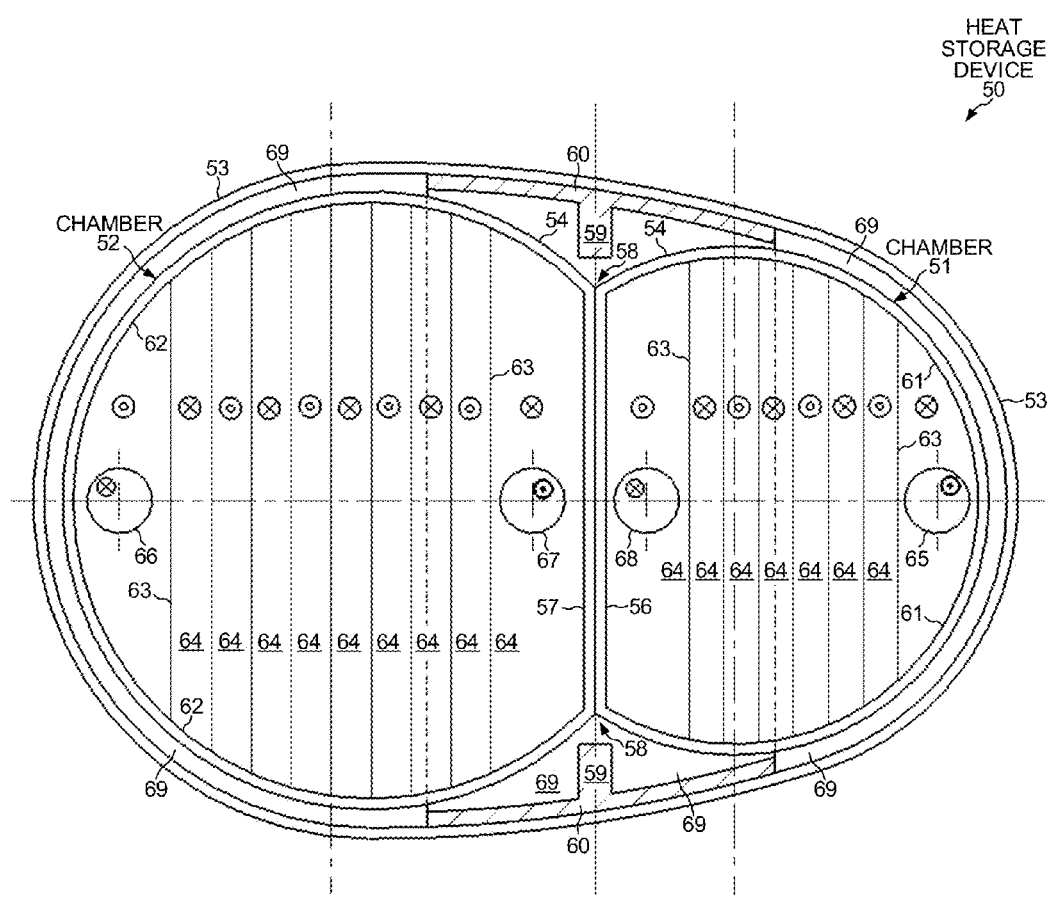
FIG. 5 is a cross-sectional schematic diagram of a heat storage device with an inner container formed from two nearly-cylindrical chambers having different diameters.

FIG. 5 shows another embodiment of a heat storage device 50, particularly for the coolant of a combustion engine for motor vehicles, that has at least two interconnected chambers 51-52. A method is also described for the production thereof. Heat storage device 50 has an outer container 53 that forms a shared space enclosing an inner container 54 made up of the two inner chambers 51-52. Heat storage device 50 forms an insulated space 55 containing a high vacuum. Each of the chambers 51 and 52 is a segment of a circular cylinder that is cut along a chord of the circular cross section. The chambers are oriented adjacent to one another at partition walls that lie on the chords that delimit the respective circular cross sections.

Heat storage device 50 is a variant of the heat storage device disclosed in German patent application no. DE102010010276A1, which had only one chamber. Heat storage device 50 must be accommodated within the confined space of the engine compartment of an automotive vehicle. Having a circular cylindrical shape of inner container 54 is advantageous in order to keep the walls of inner container 54 as free as possible from bending stresses. On the other hand, a circular cylindrical shape usually does not efficiently use the space in the engine compartment that remains available for the heat storage device. These two competing considerations led the inventor to the idea of subdividing inner container 54 into two chambers, each of which having the advantage of being nearly cylindrical in shape, but yet allowing the two circular cylinders partially to collapse into one other such that partition walls 56-57 at chords of the circles tie the chambers together.

The design of inner container 54 has the consequence that the outer contour of inner container 54 has two constrictions 58 at the junction of the partition walls 56-57. The separation between inner container 54 and outer container 53 along the lines of the constrictions 58 increases the risk that outer container 53 will be deformed from the suction of the vacuum. This separation between the junctions of the two cylindrical half shells and outer container 53 must be bridged. Heat storage device 50 is designed in such a manner that the dimensional stability of outer container 53 is ensured without affecting the heat insulation between inner container 54 and outer container 53. A dimensionally stable, bar 59 of a rectangular supporting frame 60 is oriented in the plane defined by the partition walls 56-57 and is attached over its entire length to the inner surface of outer container 53 opposite the constrictions 58. For example, supporting frame 60 can be attached to outer container 53 by spot welding. Supporting frame 60 has an approximately T-shaped cross section such that the cross bar of the T is attached to outer container 53, and the vertical bar 59 of the T projects inward.

During assembly of heat storage device 50, however, it is not possible to shift a supporting frame 60 into position if the two chambers 51-52 are circular cylinders with different diameters and if the opening width for supporting frame 60 in the direction normal to the axes of the cylindrical chambers is smaller than the outer diameter of the smaller of the two chambers. In order to solve this problem, the supporting frame is prepared as a U-shaped insert portion, without any frame side extending in the axial direction of the chambers. Supporting frame 60 is first pushed in the plane of the partition walls 56-57 over the assembled inner container 54, and then the still lacking frame side is inserted into the supporting frame. Supporting frame 60, together with inner container 54, is brought into the correct position inside outer container 53, and subsequently the securing of inner container 54 relative to outer container 53 takes place. Outer container 53 is then closed, and a high vacuum between the inner and outer containers is generated.

FIG. 5 is a cross-sectional view of heat storage device 50 from above. The embodiment of FIG. 5 is constructed for the conditions in an engine compartment of a motor vehicle, taking into account the required capacities of heat storage device 50 and the quasi-oval cross section of the device. Chambers 51-52 form inner container 54 and are circular cylindrical segments having different circular diameters. The cylindrical lateral surfaces 61-62 of chambers 51-52, respectively, wrap around and attach to the two ends of each partition wall 56 and 57. Partition walls 56-57 are parallel, planar and of the same size. Owing to the different cylinder diameters, partition wall 56 along the chord of the smaller chamber 51 intersects the circle of the cylindrical chamber at a larger angle than does partitional wall 57 intersect the circle of the larger cylindrical chamber 52. Parallel partition walls 56-57 tie the chambers 51 and 52 of inner container 54 together and are exposed only to tensile stress and not to any bending stresses. The inner volume of each chambers 51 and 52 is subdivided by partition walls 63 into channels 64.

Partition walls 63 allow overflow of the supplied coolant into the adjacent channel 64 alternately at the top and bottom of inner container 54 so that the coolant flows along a meandering path. The inflow and the outflow of the coolant occur at the two facing ends of inner container 54 on its bottom side through openings 65-66 in the bottom of inner container 54. Additional openings 67-68 are provided on both sides of partition walls 56-57. Openings 67-68 connect the two chambers 51-52 to form a shared volume.

Inner container 54 is ensheathed on all sides by outer container 53, which maintains a separation from the inner container in order to form an insulated space 69. Before inner container 54 is introduced into outer container 53, supporting frame 60 is placed next to the inner surface of outer container 53. Supporting frame 60 is rectangular and has an approximately T-shaped cross section. Frame 60 is positioned such that the vertical bar 59 of the T faces inner container 54 and is parallel to the plane of the partition walls 56-57. After the insertion of inner container 54 and of supporting frame 60 into the outer container 53, supporting frame 60 is attached to the inner surface of outer container 53 at the position at which it was previously placed. A firm connection of outer container 53 to supporting frame 60 can be achieved with spot welding. After the final securing of inner container 54 inside outer container 53, contact between supporting frame 60 and inner container 54 at bar 59 is not possible, and no thermal bridge can be formed across bar 59. Due to the high vacuum in the insulating space 69, outer container 53 is pulled in against the supporting frame 60.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A system comprising:
an engine;
a coolant circulation system, wherein the coolant circulation system and the engine have a combined capacity for containing a coolant; and
a heat storage device, wherein the coolant flows from the heat storage device, through the coolant circulation system and into the engine, wherein coolant that has been heated by the engine is kept hot by the heat storage device, wherein the heat storage device has a capacity for coolant that is greater than the combined capacity for coolant of the coolant circulation system and the engine, and wherein the heat storage device contains vertically oriented deflecting plates that guide the coolant through the heat storage device in vertically oriented meandering paths.

2. The system of claim 1, wherein the capacity for coolant of the heat storage device is twice as large as the combined capacity for coolant of the coolant circulation system and the engine.

3. The system of claim 1, wherein the engine is a combustion engine of a motor vehicle.

4. The system of claim 1, wherein the heat storage device has an inside with a bottom, and wherein an opening of an inlet for the coolant into the heat storage device is located at the bottom of the inside of the heat storage device.

5. The system of claim 1, wherein the heat storage device has an inside with a top, and wherein an opening of an outlet for the coolant from the heat storage device is located at the top of the inside of the heat storage device.

6. The system of claim 1, wherein an opening of an outlet for the coolant from the heat storage device is located at mid height inside of the heat storage device.

7. A method of using a heat storage device, comprising:
(a) transferring a first portion of hot coolant from the heat storage device through a coolant circulation system to an engine, wherein the heat storage device has an inside with a bottom; and
(b) while the hot coolant is being transferred in (a), transferring cold coolant from the engine through the coolant circulation system to the heat storage device, wherein the cold coolant in (b) enters the heat storage device at the bottom of the inside of the heat storage device, and wherein the heat storage device contains vertically oriented deflecting plates that guide the coolant through the heat storage device in vertically oriented meandering paths.

8. The method of claim 7, wherein the coolant circulation system and the engine have a combined capacity for containing the coolant; and wherein the heat storage device has a capacity for coolant that is greater than the combined capacity for coolant of the coolant circulation system and the engine.

9. The method of claim 7, further comprising:
(c) transferring a second portion of hot coolant from the heat storage device to the engine.

10. The method of claim 9, wherein the engine has a temperature that increases after the first portion of coolant is transferred into the engine, and wherein the second portion of hot coolant is transferred to the engine in (c) after the increasing temperature of the engine approaches the falling temperature of the first portion of coolant in the engine.

11. The method of claim 9, wherein the second portion of hot coolant is transferred in (c) in response to an engine starter being actuated.

12. The method of claim 7, wherein a total volume of coolant is present in the coolant circulation system, the engine and the heat storage device, and wherein the heat storage device has a capacity for coolant that equals the total volume of coolant in the coolant circulation system, the engine and the heat storage device.

13. The method of claim 7, wherein the first portion of hot coolant is transferred in (a) in response to a lock on a driver-side door of a vehicle being opened.

14. A system comprising:
an engine that heats a coolant;
a coolant circulation system, wherein the coolant circulation system and the engine have a combined capacity for containing the coolant; and
a heat storage device that insulates coolant that has been heated by the engine, wherein the heat storage device contains vertically oriented deflecting plates that guide the coolant through the heat storage device in vertically oriented meandering paths, and wherein the heat storage device has a capacity for coolant that is greater than the combined capacity for coolant of the coolant circulation system and the engine.

16. The system of claim 14, wherein the heat storage device includes an inner container and an outer container, and wherein a high vacuum exists between the inner container and the outer container.

16. The system of claim 14, wherein the heat storage device has an inside with a bottom, and wherein an opening of an inlet for the coolant into the heat storage device is located at the bottom of the inside of the heat storage device.

* * * * *